Jan. 3, 1956         K. WILFERT              2,729,158
           HEATING INSTALLATION FOR MOTOR VEHICLES
Filed May 6, 1950                          3 Sheets—Sheet 3

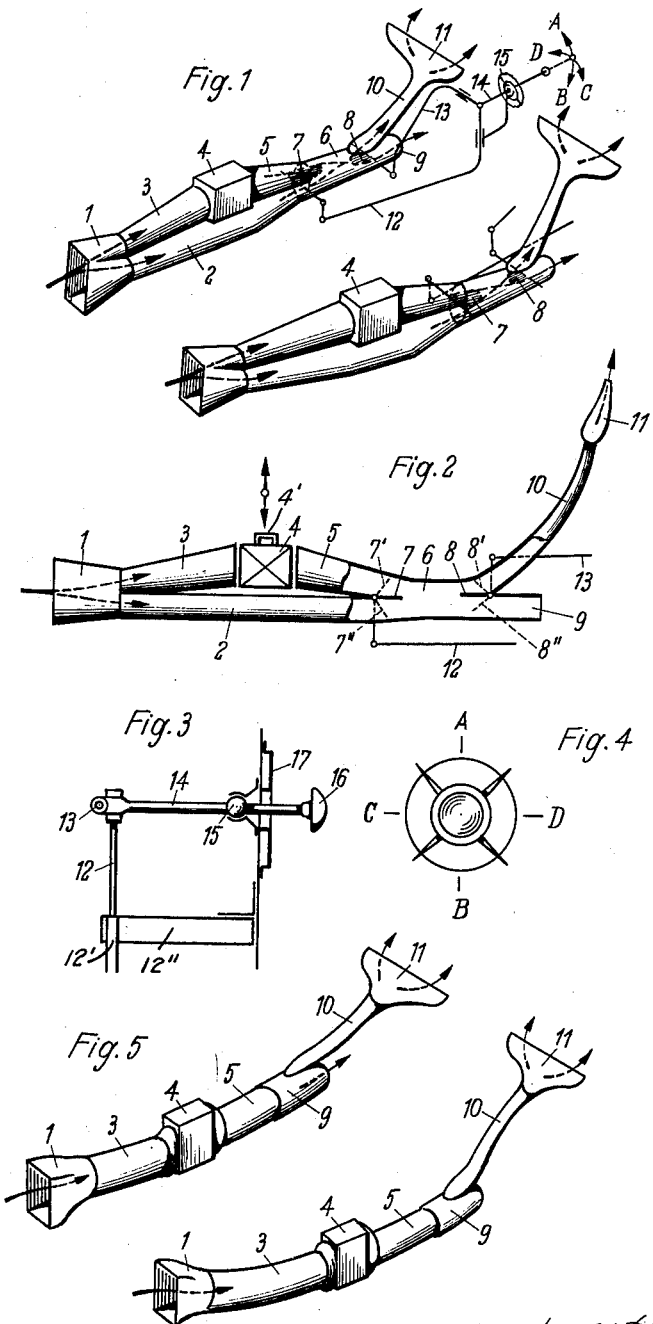

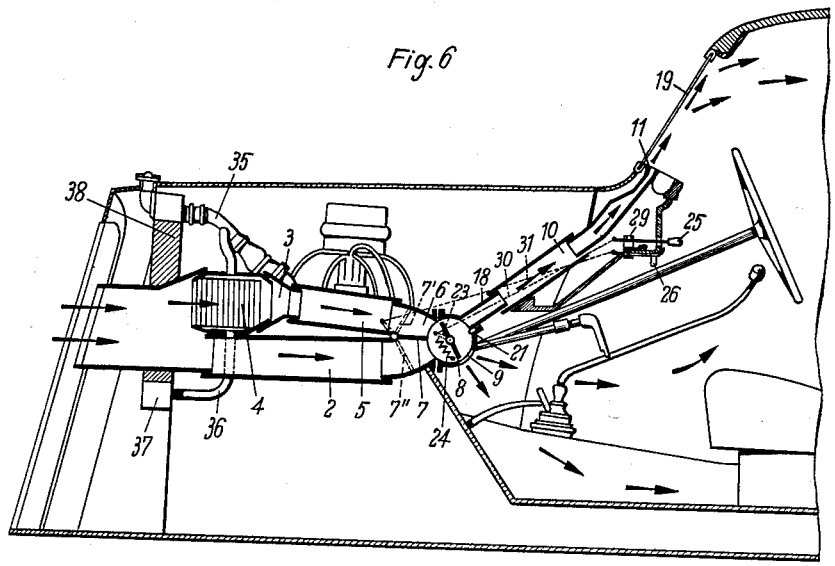
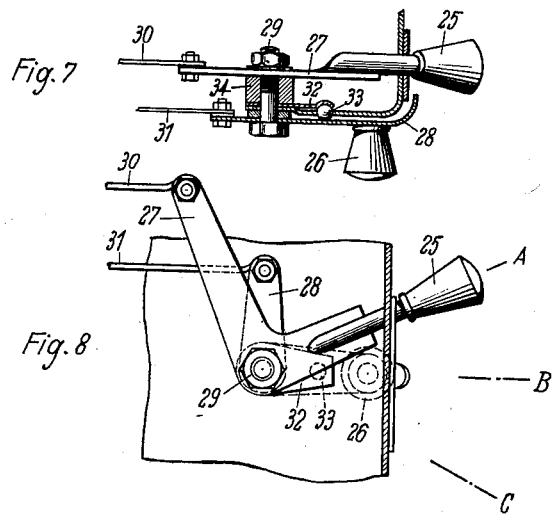

Inventor
Karl Wilfert
By Dicke and Padlon
Attorneys

United States Patent Office 2,729,158
Patented Jan. 3, 1956

2,729,158

HEATING INSTALLATION FOR MOTOR VEHICLES

Karl Wilfert, Sindelfingen, Kreis Boblingen, Germany, assignor to Daimler-Benz Aktiengesellschaft, Stuttgart-Unterturkheim, Germany Application May 6, 1950, Serial No. 160,431

Claims priority, application Germany May 7, 1949

4 Claims. (Cl. 98—2)

The present invention relates to heaters for motor vehicles, and has as its main object a simple construction, a suitable arrangement of the heater in the vehicle, an advantageous mode of operation and control of the heat output suitable for different requirements together with as economical as possible a utilization of the engine temperature or the heating temperature.

One feature of the present invention resides therefore essentially in the fact that for heating as well as for ventilation, fresh air is used, the temperature of which may be readily controlled by mixing a stream of hot air and a stream of cold air. In that case, the hot air stream preferably receives its heat from a heat exchanger which, for instance, transfers heat from the cooling water while the cold air stream may be fed to the mixing space directly from outside of the vehicle.

At the same time, a specially suitable possibility for utilization of the heated fresh air lies in defrosting the windshield, thereby keeping the same clear. Suitable shifting or control devices are provided for arbitrarily changing from heating to ventilation, or to control the heating by mixing hot and cold air. Suitable shifting or control devices are also provided for arbitrarily transferring the air to the inside of the body, especially to the passenger leg space, or to the windshield or for other purposes or to several other places.

A further feature of the present invention resides in the operation of both shifting devices by the same operating member, for instance, by a lever arranged in front of the seats and adjustable in two planes perpendicular to each other, which, when shifted or moved in one of the planes, for instance, by means of Bowden cables, changes between "hot" and "cold," and when shifted or moved in the other plane, changes between "interior room," (leg space) and "windshield" or the like.

By shifting the lever in a corresponding intermediate plane, any desired combination of the shifting component or of control position of both shifting devices may therefore be obtained, and therewith an especially and exact control by means of one single operating member.

According to a further feature of the present invention, a special heating installation or a special heating and ventilation installation for each vehicle side is provided. In that case, each of these two separate installations may be operated either together with the other or individually. The former case is advantageous because of its simplicity, the latter above all because the heating or ventilation may be adapted to the requirements of the different passengers, as every passenger, i. e., every passenger on the front or rear seats, may, from his seat, shift or regulate the heating or ventilation for his vehicle side according to his own wishes. The driver, for instance, may conduct the more or less heated air wholly or partially to the windshield, while the passenger, on his side, directs the heating air exclusively to the leg space.

By the use of two heating installations, a more constant and effective heating system may be obtained and the heat may be utilized better. The conduits as well as above all the heat exchangers can be constructed smaller and lighter, which facilitates the possibility of installation on both sides of the engine as well as the installation and arrangement of the heating device.

A further essential feature of the present invention lies furthermore in the fact that the heat exchanger is arranged in such a way that it may be easily removed and, if desired, for example during the summer, exchanged for a cooling element. In that case, a special line for cool air may be wholly omitted, if desired.

The heat exchanger, for such purpose, may be provided with a handle so that it can be removed or replaced by any passenger without special preparations. With a sufficiently tight seat, special connections to the fresh air line or the heating line need not be provided under those circumstances.

Furthermore, the present invention provides the use of two separate operating members for the mixing device, on the one hand, and for the distributor device, on the other hand.

A further feature of the present invention relates to the special arrangement of the shifting members and operating members for the mixing device, and especially for the distributor device.

Other objects and features of the present invention will become more obvious from the following description when taken in connection with the accompanying drawing which shows, for purposes of illustration only, several preferred embodiments, and wherein:

Figure 1 shows in perspective an arrangement with a combined heating and ventilation installation on each side of the vehicle to the right and to the left of the engine;

Figure 2 is a partial longitudinal section through an installation essentially corresponding to Figure 1;

Figure 3 is a side view of the shifting mechanism according to Figure 1;

Figure 4 is a view of the shifting mechanism viewed from the inside of the body;

Figure 5 is a perspective view of a simplified heat installation, one on each side of the vehicle;

Figure 6 is a longitudinal sectional view through a heat and ventilation installation mounted in the engine space of a motor vehicle, provided with means for completely cutting off the air stream;

Figures 7 and 8 show an operating device for the shifting mechanism for adjusting or cutting off the air conduit according to the arrangement in Figure 6, in side view and top view;

Figure 10:
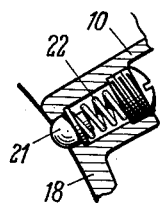
Figure 10 shows an air switching flap detent in detail, taken on a longitudinal section.

The Figures 3, 4 and 7 to 12 are drawn on a larger scale than Figures 1, 2 and 5, 6.

The heating and ventilation installations according to Figures 1 and 2 consist each of an air inlet port 1 which, for instance, receives air directly from the outside, by-passing the radiator, which for example, may be located directly behind the radiator grill. Behind thie air inlet port, the conduit is divided into a lower ventilation and cold air conduit 2 and an upper heating or warm-air conduit section 3, consisting, for instance, of a funnel made of any suitable material, such as, for example, woven fibrous material, so that fresh air may enter both the upper and lower conduits.

The heating conduit section 3 leads to heat exchanger 4 in which the waste heat of the cooling water, or also of any other heating means, for example, the exhaust gases, may be transferred to the air stream which passes through conduit 3. The heated air then goes through the warm-air conduit section 5, which may also consist of a funnel made of any suitable material such as, for example, woven fibrous material, into a mixing space or combining means 6 where it is mixed with the cold air stream fed directly through the lower conduit 2, if so desired. At the point of junction of conduits 2 and 5, a shifting member or control flap 7 is arranged which, as particularly shown in Figure 2, may be adjusted from an end position 7', shown in dotted lines, over the intermediate position 7, shown in full lines, to the other end position 7", also shown in dotted lines, thereby opening either cold-air conduit 2 or both conduits 2 and 5, or only warm-air conduit formed by conduit sections 3, 5 through heat exchanger 4. The air eventually flows, after being thus mixed or combined, from the mixing space 6 through another shifting device or control flap 8 to a first branch or utilization conduit formed by an outlet piece 9 and from there to the inside of the body, for instance, to the leg space for persons sitting on front seats or into channels serving for heating the body, or through a second branch or utilization conduit 10 to the defrosting nozzles 11 which serve to keep the windshield or window panes clear. Flap 8 may, in that case, be changed again from end position 8' to end position 8" and thereby direct the air stream either to the leg space of the passengers or to the windshield.

The heating and ventilating installation on the two opposite sides of the engine may be constructed and arranged symmetrically or also interchangeably similar which simplifies the manufacture and the assembly. However, if so desired, only one or the other of these installations alone may also be used to defrost the windshield. Other connecting lines or branch conduits may be provided for heating or ventilating other devices, such as, for example, the heating of the battery, of auxiliary starting apparatus or the like. The control members or shifting flaps 7 and 8 may be operated each by itself or by a common operating member. For that purpose, the levers for flaps 7 and 8 are connected in the illustrated example by means of Bowden cables 12 and 13 with operating lever 14 which is supported, for example, by means of a ball articulation 15, in such a way that it may be shifted in all directions of two mutually perpendicular planes, for instance, from the front seats below the windshield or from any other suitable part of the vehicle. The Bowden cables each of which comprises an inner cable 12 and 13 and an outer shielding cable, of which only the outer shielding cable 12' is shown in Figure 3, are such that the inner cables 12 and 13 are adjustable with respect to their outer cables when the respective ends of the inner cables 12 and 13 are moved in a direction having a component which is coaxial with the cables 12 and 13 respectively. However, a movement of the ends of one of the inner cables 12 and 13 in a plane transverse to the plane including the axis thereof will not produce any relative movement to speak of between such inner cable and the corresponding outer shielding cable, as is well known in connection with such Bowden cables, which are relatively flexible in directions transverse to the axial direction of the cables themselves. The outer shielding cable 12' is held stationary, as is conventional with such type of cables by means of a support, schematically indicated in Figure 3 by reference numeral 12". The outer cable of the other Bowden cable, of which only the inner cable 13 is shown in Figure 3, is secured in a similar manner. Lever 14 carries an operating button 16. Arranged concentrically with lever 14 and with operating button 16 is a scale or indicating device which is ring-shaped and divided, for instance, into four sections with the inscription of "hot," "cold," "windshield" and "leg space."

The manner of operation of the operating device is as follows:

In the shown mean or intermediate position of lever arm 14, flaps 7 and 8 are also in their illustrated mean or intermediate positions. If lever 14 is shifted in a vertical plane A—B, that is, if the operating button is turned upwardly to "hot," only the Bowden cable 12 is operated in such a way that flap 7 is shifted to position 7', and the fresh air entering through the cold air conduit 2 is more or less shut off. The fresh air, therefore, will with a change of the operating button 16 in the upward direction more and more seek its way exclusively through the heat exchanger 4 and thus increase the heating effect. The inner Bowden cable 13 at the same time remains substantially unaffected by such movement as it is permitted to bend laterally about the point at which the outer cable is held stationary (not shown), thereby describing a path corresponding to an arc which essentially does not change the axial position of the inner cable 13. On the other hand, if the operating button 16 is shifted downward in the direction B (to "cold"), the air will be directed mainly or exclusively through the cold air conduit 2, the conduit 5 being closed. With this movement of the lever 14 in the vertical plane the Bowden cable 13 remains unchanged or substantially unchanged, as explained above. With a shifting in the horizontal plane C—D, on the contrary, only or substantially only the Bowden cable 13 and with it the flap 8 is operated, while the Bowden cable 12 is permitted to traverse an arcuate path with the center coinciding substantially with the place at which the outer shield 12' is supported by the support member 12" whereby the axial position of the inner cable 12 remains substantially constant and the flap 7 is not or substantially not shifted. A movement of the operating button 16 to the right in the direction D moves the flap to the position 8', a shifting to the left in the direction C moves it to the position 8", which causes an alternate closing of the conduit 10 leading to the windshield, respectively the conduit 9 leading to the leg space.

If the lever is shifted in an oblique direction instead of vertically or horizontally, for instance right upward (between A and D, respectively between "hot" and "leg space"), a simultaneous shifting of both Bowden cables, and of both control flaps 7 and 8 is effected, corresponding to the movement of the respective components resulting from this shifting. The flap 7 thus moves toward the position 7" and the flap 8 toward the position 8', and therefore the leg space receives more heat while the cold air conduit 2 and also the conduit 10 leading to the windshield are wholly or partially closed. In this way any desired combination of control positions of the two control flaps may be obtained by the operation lever 14.

In the illustrated embodiment a separate operating mechanism is provided for the heat and ventilation installations of each vehicle side. This enables the passengers to control the heating or the ventilation of their vehicle side largely independently of each other. But if desired, both installations may be operated by one single operating device, or a common operating device may be provided for the two flaps 7, or for the two valves 8 of both vehicle sides. The heat exchanger 4 is suitably arranged between the warm-air conduits 3 and 5 in an easily removable manner, put in from the top side in a way similar perhaps to a pocket battery, without being especially fixed thereto, but with the necessary tightness of the air connections so that for the removal, if desired, only the connections for the heating means have to be interrupted or disengaged. For simplified removal and replacement, the heat exchanger may be provided with a handle 4'.

An especially simple example of the arrangement is shown in Figure 5. In that case no special cold air conduit is provided, so that the whole air stream entering at point 1 must flow over the warm-air conduits or lines 3 and 5 through the heat exchanger 4. A special control member may be omitted. But such a member may also be provided to close the line more or less or to change from leg space to windshield. In any case it is suitable, and in the case of the omission of a shut-off device also necessary, to arrange the heat exchanger 4 so as to be removed easily, thereby providing for the possible use of the installation in winter for heating and in summer for ventilation of the inside of the body. In that case a connecting line piece or a special cooling element of a suitable construction may be substituted for the heat exchanger 4.

The installation according to Figure 5, on the one hand, has the advantage of simplicity and cheapness of construction as well as that of a simple operation, and, on the other hand, has the advantage of a light weight and small space requirements. It is therefore especially adapted for an additional arrangement in vehicles already in use.

Figures 9, 11, 12:
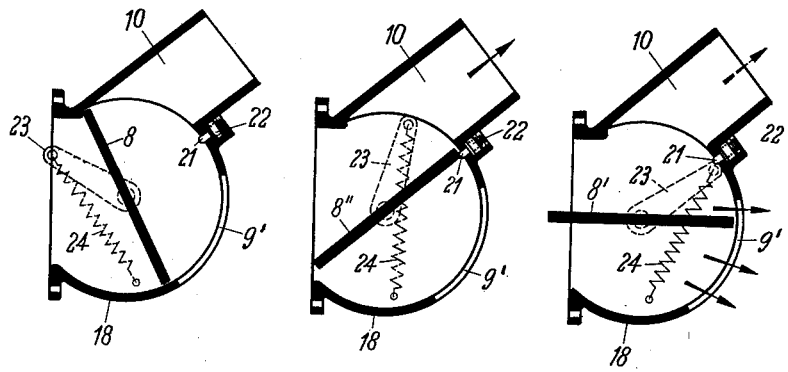
Figures 9, 11 and 12 show the air switching device of the arrangement according to Figure 6 in a section, with three different shifting positions of the air switching flap.

In the example according to Figure 6, et seq., the control member or distributor flap 8 is arranged, for instance, in a ball shaped casing 18 in such a way that the cooling and heating air stream may be shut off completely; in that condition the flap 8 is in the shut off position as shown in Figure 9. If the flap is moved from the position 8 of Figure 9 to the position 8" of Figure 11, it opens the path behind the mixing space or combining chamber 6 to the branch conduit 10 and to the de-frosting nozzles 11. In the position 8' according to Figure 12 the main part of the air stream coming out of the mixing space or combining chamber 6 flows through the opening 9' of the casing 18 to the leg space inside the car, and a small part of the air flows through the de-frosting nozzles 11, which is however, enough to keep the windshield 19 clear.

The shifting to the position 8" according to Figure 11 is effected arbitrarily with the help of a spring detent just at the moment when it reaches the shifting position 8" (Figure 11).

By means of spring 24 connected with the adjusting lever 23 which during shifting of the flap 8 passes through the dead center point thereof and thereby reverses the resulting turning moment, the flap 8 is kept in the momentary position to which it is shifted. The adjustment of the mixing flap 7 and the distributor flap 8 is effected, in the example shown in Figure 6, by two handles 25 and 26 (Figures 7 and 8). Both handles are mounted on an upper and a lower angular lever 27 and 28, and both levers turn around a common pin 29. Each lever operates one Bowden cable 30, 31, rods or the like. The cable 30, for instance, leads to the distributor flap 8 and the cable 31 to the mixing flap 7. Both handles 25 and 26 may be changed to three shifting positions A, B and C (Figure 8).

In the position A of the handle 25 the distributor flap 8 is closed (Figure 9). In the position B of the same handle the defrosting nozzles 11 are connected through the conduit 10 (Figure 11), and in the position C the leg space is connected (Figure 12). In the position A of the handle 26 unheated fresh air, in the position B tempered mixed air and in the position C only hot air flows to the inside of the vehicle. The mean position of the lever 28 is obtained by a spring detent consisting of a ball 33 supported in the opening of an intermediate wall and biased by a spring finger 32. The finger 32 is, in that case, axially supported by the spacing bushing 34 (Figure 7) on the adjusting pin 29. If necessary, both levers may also be stopped in all shifting positions by a detent provided on the shifting levers directly. By reason of spring arrangement 24 on flap 8, such detents become unnecessary, however, in the end positions of the lever 25.

The feed conduit for the cooling water to the heat exchanger 4 is, in the example shown in Figure 6, a branch conduit of the upper conduit 35 leading from the engine to the radiator 38. The return line 36 from the heat exchanger 4 leads to the lower water tank 37 of the radiator 38 of the engine. If desired, valves, taps or similar means may be provided in these feed and return conduits 35, 36, to enable a parallel connection of the heat exchanger 4 with the radiator 38, independent of the use of the heat installation. This arrangement is especially advantageous during hot days, when the heat installation is not operated, while, however, the heat exchanger is welcome as an additional radiator for the engine.

It will be noted that the construction shown and described will serve admirably to accomplish the objects stated above. It is to be understood, however, that the construction disclosed above is intended merely as illustrative of the invention and not as limiting, as various modifications may be made without departing from the scope of the invention as defined by the appended claims.

What I claim is:

1. Heating installation for motor vehicles comprising a warm-air conduit with a heat exchanger therein and a cold air conduit, said warm-air conduit and said cold-air conduit extending toward the front of the vehicle and being open at the forward ends thereof, combining conduit means connected to the rear ends of said warm-air conduit and said cold-air conduit including combining valve means for adjustably mixing warm and cold air from said warm-air conduit and said cold-air conduit respectively, a first utilization conduit and a second utilization conduit, said utilization conduits extending toward the passenger compartment at different points thereof, distributor means connected between said combining conduit means and said first and second utilization conduits including distributor valve means for variably distributing the mixed air to said first and said second utilization conduit respectively, and a common actuating means for said combining valve means and said distributor valve means, said common actuating means including a shifting lever supported for movement in two planes at right angle with each other, and means for connecting said shifting lever with said combining valve means and said distributor valve means for operating said combining valve means during movement of said lever in one of said planes and for operating said distributor valve means during movement of said lever in the other of said planes.

2. Heating installation according to claim 1 wherein each vehicle comprises a windshield, defrosting means for said windshield, and means connecting said second utilization conduit with said defrosting means, and an indicating ring arranged substantially concentrically with said lever for indicating the control effect on said heating installation corresponding to the different positions to which said lever may be shifted.

3. Heating installation for motor vehicles comprising conduit means including a heat exchanger therein in heat-transferring relationship with the air passing therethrough, said first-named conduit means extending toward the front of the vehicle and being open at the forward end thereof, first branch conduit means extending into the passenger compartment for heating the inside of the vehicle, second branch conduit means extending into the passenger compartment at a different point from said first branch conduit means, distributor conduit means connected between the rear end of said first-named conduit means and said first and said second branch conduit means including a closure member for variably distributing the heated air to said first branch conduit means and to said second branch conduit means, said closure member having two end positions, said closure member closing both branch conduit means toward said first-named conduit means in one of said end positions and opening both branch conduit means toward said first-named conduit means in the other of said end positions, spring means connected with said closure member for alternately urging said closure member to one or the other of said end positions, said closure member having an intermediate position for opening essentially only said second branch conduit means, said intermediate position coinciding substantially with the dead center position of said spring means, and an arresting means for arresting said closure member at substantially said intermediate position.

4. A heating installation for motor vehicles having a windshield comprising a warm-air conduit including a heat exchanger, a cold-air conduit adjacent said warm-air conduit, said warm-air conduit and said cold-air conduit being freely exposed to the outside air at one end thereof, means located behind said heat exchanger for combining said warm-air conduit with said cold-air conduit to form a mixing conduit, a shifting member pivotally supported at the place of juncture of said first-named conduits and having two end positions, said shifting member in one of the end positions thereof closing said warm-air conduit and in the other end position thereof closing said cold-air conduit while in the intermediate position opening both of said first-named conduits with varying cross-sectional ratios, a first branch conduit leading from said mixing conduit and extending behind said windshield, a second branch conduit leading from said mixing conduit into the lower part of the inside of the vehicle, a second shifting member pivotally supported at the branching-off place of said mixing conduit into said two branch conduits and having two end positions, said second shifting member closing said first branch conduit in one of the end positions thereof and closing said second branch conduit in the other of the end positions thereof and in the intermediate position opening both said branch conduits with varying cross-sectional ratios, an actuating lever, means for supporting said actuating lever for movement in two mutually perpendicular planes, and means for connecting said actuating lever with said shifting members to actuate one of said shifting members with movement of said lever in one of said planes and to actuate the other of said shifting members with movement of said lever in the other of said planes and for actuating both of said shifting members with movement of said lever in a direction having components in both of said planes.

References Cited in the file of this patent
UNITED STATES PATENTS

| | | |
|---|---|---|
| 2,225,071 | Meyerhofer | Dec. 17, 1940 |
| 2,284,764 | Parks | June 2, 1942 |
| 2,306,796 | Staley | Dec. 29, 1942 |
| 2,342,901 | Schutt | Feb. 29, 1944 |
| 2,391,408 | Galamb et al. | Dec. 25, 1945 |
| 2,430,759 | Crise | Nov. 11, 1947 |
| 2,445,392 | Findley | July 20, 1948 |
| 2,473,281 | Findley | June 14, 1949 |
| 2,488,278 | Finley | Nov. 15, 1949 |
| 2,502,871 | Mayo | Apr. 4, 1950 |
| 2,544,465 | Matulaitis | Mar. 6, 1951 |

FOREIGN PATENTS

| | | |
|---|---|---|
| 829,324 | France | June 20, 1938 |